Sept. 18, 1945.  P. M. BIRK ET AL  2,385,052
AMMUNITION BELT TENSION METER
Filed July 26, 1943
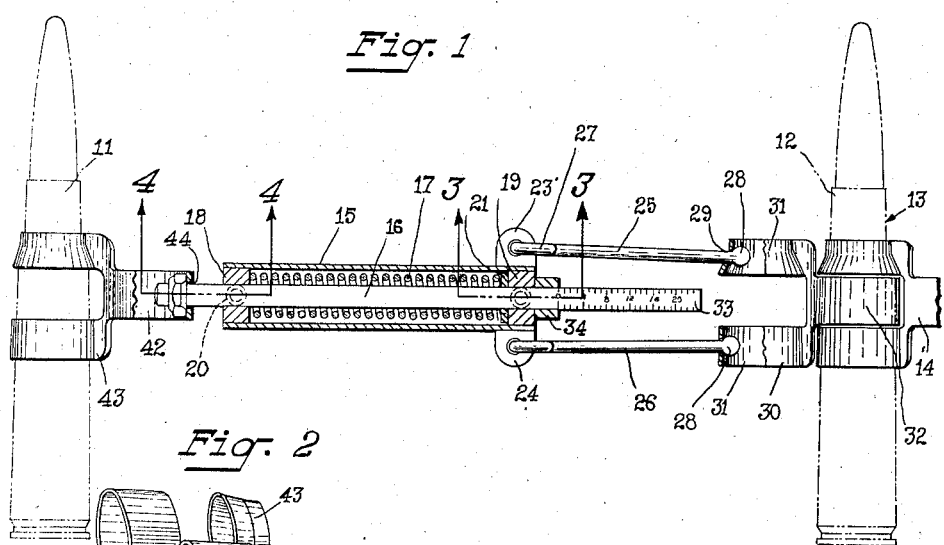
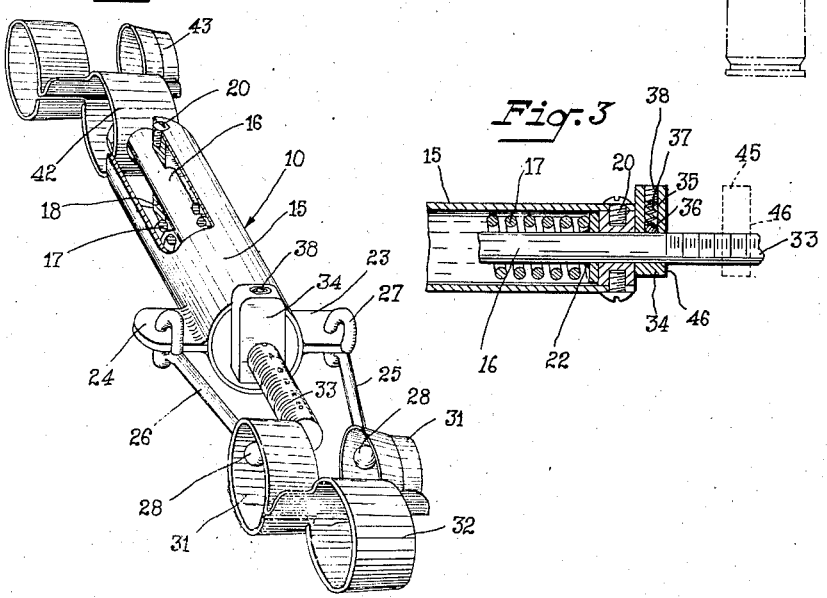
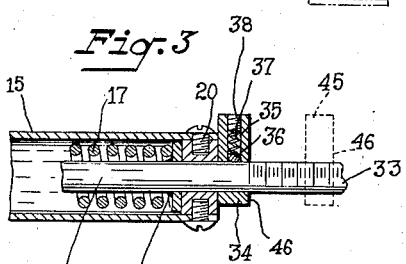
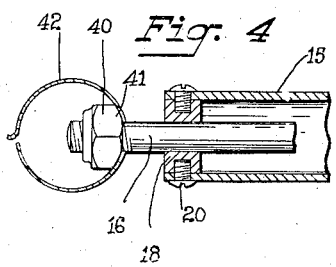
INVENTORS
PAUL M. BIRK
CHARLES E. SLATER
BY
ATTORNEY Patented Sept. 18, 1945

2,385,052

UNITED STATES PATENT OFFICE 2,385,052

AMMUNITION BELT TENSION METER

Paul M. Birk, Kenmore, and Charles E. Slater, Jr., Williamsville, N. Y., assignors to Curtiss-Wright Corporation, a corporation of Delaware Application July 26, 1943, Serial No. 496,228

7 Claims. (Cl. 73—167)

This invention relates to tension meters and more particularly to tension meters for measuring the pulling force within an ammunition belt as it is drawn through the automatic gun by the firing action thereof.

In perfecting ammunition feed chutes so that undue strain is not placed upon ammunition belts such as to halt the feed of the same to the automatic gun, it is necessary that some form of meter, which can be located in the ammunition belt itself, be provided, in order that the designer of the feed chute may know what the pulling forces for a given feed chute may be.

It is therefore an object of the present invention to provide a tension meter particularly designed for ammunition belts which can be quickly attached between any adjacent shells within an ammunition belt and adapted to receive the direct strain as the belt is moved along by the firing action of the gun, and wherein the connection of the device within the belt is simply made by removing two adjacent cartridges from their links and reinserting them to include links of the tension meter.

It is another object of the invention to provide a tension meter for ammunition belts wherein the reading is recorded and can be made after the gun is fired.

It is still another object of the invention to provide a tension meter for ammunition belts in which the ordinary cartridge links can be used as the means for attaching the meter to adjacent shells of the belt.

According to the present invention there is provided a tension meter which has overlapping or telescoping inner and outer parts normally maintained in a collapsed or unextended position by a weighing spring. On an extension of the inner part there is provided an indicia scale and an indicator adapted to be moved from its zero location by the outer part as the parts are extended by the pulling force of the gun. This indicating element is frictionally connected to the inner part and will remain at the maximum point to which the same has been moved after the pulling force on the tension meter has ceased. On the outer part there is provided ear portions extending laterally from the sides thereof to which are connected respectively swivel links. These swivel links lie astraddle of the indicating arrangement and are respectively connected to double ring portions of a cartridge link used as a part of the attaching means for the meter. The inner part is connected at the opposite end of the meter to a single ring portion of a cartridge link being used at that end as a part of the attaching means for that end of the meter, the connection being such as to permit the meter to swivel with respect to the link. The cartridge links are a part of the meter and to connect the meter in the ammunition belt, it only is necessary to remove adjacent cartridges at the location therealong where it is desired to insert the meter and then reinsert the cartridges into the links and through the links of the tension meter.

For other objects and for a better understanding of the invention, reference may be had to the following detailed description taken in connection with the accompanying drawing, in which Fig. 1 is a sectional view of the tension meter connected by means of cartridge links to adjacent shells of an ammunition belt.

Fig. 2 is a perspective view of the tension meter itself with parts thereof cut away to show the internal parts.

Fig. 3 is an enlarged sectional view taken in the region of the indicating arrangement and along lines 3—3 of Fig. 1.

Fig. 4 is a sectional view of the tension meter taken at the opposite end thereof and showing the connection of the inner part with the single ring portion of the cartridge link, the view being taken along lines 4—4 of Fig. 1.

Referring now to the figures, there is shown a tension meter 10 adapted to be connected between any adjacent shells 11 and 12 of a flexible ammunition belt 13 comprising the usual shells or cartridges and cartridge links 14. The tension meter includes in general an outer or cylinder part 15 in which there is disposed an inner part 16 and a weighing coil spring 17. The cylinder part 15 is closed at its ends by closure elements 18 and 19 through which the inner part extends, the closure parts 18 and 19 being secured by screws 20. One end of the spring 17 bears against a piston 21 weldingly secured to the inner part 16 as indicated at 22. The opposite end of the spring bears against the closure part 18 of the cylinder. The spring at all times tends to maintain the parts in an overlapped and unextended condition.

On the cylinder part 15 there is provided laterally extending ear portions 23 and 24, to which are connected respectively swivel links 25 and 26. The ear portions have holes therethrough and the links are turned up at their ends as indicated at 27 to extend through these holes to provide swivelling movement with respect to the ear portions. The opposite ends of the swivel links 25 and 26 have ball enlargements 28 which, when extended through openings 29 in a cartridge link 30, will allow certain amount of swivel movement at that location. The cartridge link 30 is similar to the link 14 except that it is provided with the openings 29 therein to respectively receive the swivel links 25 and 26. Each of these cartridge links has double ring portions 31 and a single ring portion 32. In this instance, the single ring portion 32 is fitted over the shell 12 and can flex with respect thereto in the ordinary manner that the cartridge link 14 can flex on the shells to which they are connected. By so connecting cylinder part 15 to double ring portions 31 of the cartridge link 30, provision is made so that the inner part 16 may extend within the space between the swivel links 25 and 26.

The inner part 16 has an indicia scale or extension 33 on which there is disposed an indicating element 34. This indicating element 34 has an opening 35 therein in which is disposed a friction element 36 backed up by a spring 37 and a retaining screw 38. The indicator 34 is moved over the indicia part of the inner member 16 by the closure member 18 of the cylinder part 15 as the tension meter is extended. But upon return of the parts to their unextended position the indicating element 34 is left in place on the indicia scale 33 due to frictional engagement of the friction element 36 therewith. A reading can accordingly be taken of the device after the strain or pull upon the same has ceased.

The inner part 16 also extends outwardly beyond the end of the closure part 18 of the cylinder part 15 and has a nut 40 thereon which is rounded as indicated at 41 to fit within a single ring portion 42 of a special cartridge link 43. The inner part 16 in its connection with the single ring portion 42 extends through an enlarged opening 44 thereof. It should thus be apparent that the tension meter can be flexed as well at this end thereof as at the end in which the swivel links 25 and 26 are used. The link 43 connects in the usual manner with the shell 11. In other words, the shells serve as retaining pins for connecting the meter with the belt. The shell as it is reinserted connects together the links of the tension meter with the standard links of the ammunition belt.

Referring now particularly to Fig. 3, there is illustrated more clearly the manner in which the indicating element 34 is moved on the indicia scale 33. As the parts are extended, the element 34 is moved to a dotted line position 45 on the scale 33. A reading can then be taken on the scale with reference to a face 46 of the indicating element 34. After this reading has been taken, the tension meter can be reset by simply returning by hand the indicating element 34 to its zero position on the indicia part 33.

It should now be apparent that there has been provided a tension meter particularly adaptable for insertion within an ammunition belt by means of which the direct pulling force upon the belt is measured, and that this tension meter is of a type that the reading may be made after the strain upon the meter has ceased. It should also be apparent that there has been provided a simple arrangement for the connection of the meter to adjacent shells of an ammunition belt in which the ordinary cartridge links have been merely slightly altered to be incorporated within the arrangement.

While various changes may be made in the detail construction, it shall be understood that such changes shall be within the spirit and scope of the present invention as defined by the appended claims.

We claim as our invention:

1. In a tension meter for measuring the pulling force acting upon an ammunition belt, external and internal parts arranged in overlapping relationship with respect to each other and being movable to extend positions, yieldable means for maintaining said parts in unextended positions, means for respectively connecting the parts to adjacent shells of an ammunition belt including cartridge links in both instances and respectively fashioned with double and single ring portions, the internal part extending beyond the external part and including means for indicating the extent to which the parts are extended, said external part having ear portions extended respectively laterally at the indicating end of the parts, and swivel links connected respectively to the ear portions of the external part astraddle of the indicating means and to the double ring portions of a cartridge link, and means for connecting the internal part for swivelling engagement with the single ring portion of the other cartridge link.

2. In a tension meter for measuring the pulling forces acting upon an ammunition belt, cooperating companion parts, one end of one of said parts being adapted to be connected to one portion of said belt and one end of the other of said parts being adapted to be connected to a second spaced-apart portion of said belt, whereby said parts may be temporarily included in said belt as an insert, a weighing spring acting against said parts to hold them in unextended positions, one of said parts having an end portion extending beyond the end of the other part which is attached to said belt and carrying a scale, and an indicator on said end portion which is movable thereover in cooperating relation with respect to said scale, said indicator being moved over said end portion by the other of said parts as the latter are extended against the action of said spring incident to the firing of the shells in said belt and remaining in the position to which it is moved when said parts are permitted to return to their unextended positions.

3. In a tension meter for measuring the pulling forces acting upon an ammunition belt, a tubular part, a part within the tubular part, one end of one of said parts being adapted to be connected to a portion of said belt and one end of the other of said parts being adapted to be connected to a second spaced-apart portion of said belt, whereby said parts may be temporarily included in said belt as an insert, a weighing spring acting against said parts to hold them in unextended positions, said second part having a scale-providing end portion extending through and beyond the end of said tubular part which is attached to said belt, and an indicator which is moved over said end portion by said tubular part as said parts are extended against the action of said spring incident to the firing of the shells in said belt and which remains in the position to which it is moved when said parts are permitted to return to their unextended positions.

4. In a tension meter for measuring the pulling forces acting upon an ammunition belt, a tubular part, a part within the tubular part, one end of one of said parts being adapted to be connected to a portion of said belt and one end of the other of said parts being adapted to be connected to a second spaced-apart portion of said belt, a weighing spring acting against said parts to hold them in unextended positions, said second mentioned part extending through and beyond the end of said tubular part which is attached to said belt and carrying a scale, and an indicator which frictionally engages said second part and which is movable thereover in cooperating relation with respect to said scale, said indicator being moved on said second mentioned part by said tubular part as said parts are extended against the action of said spring incident to the firing of the shells in said belt and remaining in the position to which it is moved when said parts are permitted to return to their unextended positions.

5. In a tension meter for measuring the pulling forces acting upon an ammunition belt of link construction and wherein the shells carried by the belt are utilized to connect adjacent links, said meter including a pair of parts which are movable with respect to one another in response to variations in tension in said belt, weighing means acting upon said parts to resist such relative movement, link elements carried by said parts, said link elements being adapted to cooperate with the links of said belt so that said shells may also be utilized to detachably connect said parts to spaced-apart portions of said belt, and means associated with said parts and responsive to relative movement between them for indicating the pulling forces acting upon said belt incident to the firing of the shells thereof.

6. In a tension meter for measuring the pulling forces acting upon an ammunition belt of link construction and wherein the shells carried by the belt are utilized to connect adjacent links, said meter including a pair of parts which are movable with respect to one another in response to variations in tension in said belt, weighing means acting upon said parts to resist such relative movement, link elements carried by said parts, said link elements being adapted to cooperate with the links of said belt so that said shells may also be utilized to detachably connect said parts to spaced-apart portions of said belt, and means associated with said parts and responsive to relative movement between them for indicating the pulling forces acting upon said belt incident to the firing of the shells thereof, said last mentioned means being operative to record the maximum value of said pulling forces.

7. In a tension meter for measuring the pulling forces acting upon an ammunition belt of link construction and wherein the shells carried by the belt are utilized to connect adjacent links, said meter including cooperating companion parts which are movable with respect to one another in response to variations in tension in said belt, a weighing spring which acts upon said parts to resist such relative movement, link elements carried by said parts, said link elements being adapted to cooperate with the links of said belt so that said shells may also be utilized to detachably connect said parts to spaced-apart portions of said belt, one of said parts having an end portion extending beyond the end of the other of said parts which is connected to said belt and carrying a scale, and an indicator which frictionally engages said end portion, said indicator being moved over said scale by the other of said parts as the latter are extended against the action of said spring and remaining in the position to which it is moved when said parts are permitted to return to their unextended positions.

PAUL M. BIRK.
CHARLES E. SLATER, Jr.